United States Patent
Gamberoni et al.

(10) Patent No.: US 8,447,501 B2
(45) Date of Patent: May 21, 2013

(54) METHOD FOR MANAGING THE AUTOMATIC STOPPAGE OF AN AUTOMOBILE

(75) Inventors: Clement Gamberoni, Paris (FR); Christophe Blond, Bonneval (FR)

(73) Assignee: Renault S.A.S., Boulogne Billancourt (FR)

(*) Notice: Subject to any disclaimer, the term of this patent is extended or adjusted under 35 U.S.C. 154(b) by 0 days.

(21) Appl. No.: 13/441,660

(22) Filed: Apr. 6, 2012

(65) Prior Publication Data

US 2012/0271535 A1     Oct. 25, 2012

Related U.S. Application Data

(63) Continuation of application No. 13/203,071, filed as application No. PCT/FR2010/050153 on Feb. 1, 2010, now abandoned.

(30) Foreign Application Priority Data

Feb. 24, 2009   (FR) ..................................... 09 00829

(51) Int. Cl.
*G06F 17/00* (2006.01)
*F02D 28/00* (2006.01)

(52) U.S. Cl.
USPC .......................................... 701/110; 701/102

(58) Field of Classification Search
USPC   701/102, 101, 110, 112, 113, 115; 123/179.4
See application file for complete search history.

(56) References Cited

U.S. PATENT DOCUMENTS

| | | |
|---|---|---|
| 6,256,992 B1 | 7/2001 | Lewis, Jr. et al. |
| 2005/0262827 A1 | 12/2005 | Ichimoto et al. |
| 2012/0123666 A1* | 5/2012 | Stoffels et al. ................ 701/113 |

FOREIGN PATENT DOCUMENTS

| | | |
|---|---|---|
| DE | 103 47 683 | 5/2004 |
| GB | 2 337 831 | 12/1999 |

OTHER PUBLICATIONS

International Search Report issued May 12, 2010 in PCT/FR10/050153 filed Feb. 1, 2010.
French Search Report issued Sep. 10, 2009 in French Patent Application No. 09 00829 filed Feb. 24, 2009.

* cited by examiner

*Primary Examiner* — Hieu T Vo
(74) *Attorney, Agent, or Firm* — Oblon, Spivak, McClelland, Maier & Neustadt, L.L.P.

(57) ABSTRACT

A method including: a) determining a value representative of temperature of exhaust gases flowing in an exhaust duct of an engine upstream from a turbine; b) comparing the representative value with a predetermined threshold value; c) if the representative value is higher than the threshold value, initiating timing-out of a first time delay during which a) and b) are repeated; d) if the representative value is lower than the threshold value, initiating the timing-out of a second time delay during which a) and b) are repeated; e) if the first time delay has elapsed and the representative value is higher than the threshold value, preventing the automatic stoppage of the engine; f) if the second time delay has elapsed and the representative value is lower than the threshold value, authorizing the automatic stoppage of the engine and resetting the measure of the timing-out of the first time delay.

10 Claims, 2 Drawing Sheets

METHOD FOR MANAGING THE AUTOMATIC STOPPAGE OF AN AUTOMOBILE

CROSS-REFERENCE TO RELATED APPLICATIONS

This application is a continuation of U.S. Ser. No. 13/203,071 filed Aug. 24, 2011, now abandoned the entire contents of which are incorporated herein by reference and is a national stage of International Patent Application No. PCT/FR10/050153 filed Feb. 1, 2010, and pursuant to 35 U.S.C. 119 claims the benefit of priority of French Application No. 09 00829 filed Feb. 24, 2009.

TECHNICAL DOMAIN TO WHICH THE INVENTION RELATES

The present invention relates to a method for managing the automatic stopping of the engine of an automobile and a method for automatically stopping such an engine managed by this management method.

TECHNOLOGICAL BACKGROUND

The so-called "hybrid" engines comprise an internal combustion engine and an electrical part which comprises at least one electric starter.

In the supercharged internal combustion engine, fresh air is introduced into an intake duct and is compressed by a compressor of a turbocharger, before being routed to an intake manifold linked to a combustion chamber of an engine cylinder via an intake valve.

After combustion, the residual exhaust gases are expelled toward an exhaust duct through an exhaust valve and drive a turbine driving said turbocharger placed in this exhaust duct.

The internal combustion engine produces polluting exhaust gases, notably comprising carbon monoxide, unburned hydrocarbons, particulates and nitrogen oxide molecules.

In the "hybrid" engines, provision is made, in order to limit these polluting emissions, to stop the internal combustion engine when the speed of the engine is lower than a predetermined threshold, then to restart it using the electric starter.

Thus, the internal combustion engine is stopped automatically, without the intervention of the driver, for example when the vehicle is stopped at a red light.

The emissions of polluting exhaust gases are thus limited.

However, when the internal combustion engine is stopped in this way, the oil circulation of this engine is also stopped and the central housing of the turbocharger is no longer cooled by this oil circulation. If the automatic stopping of the engine is initiated while the temperature of the exhaust gases circulating in the turbine of the turbocharger is very high, these exhaust gases may provoke a rise in temperature of the central housing of the turbocharger which is damaging to the operation thereof.

In particular, the coking of the oil present in this central housing at high temperature produces a solid residue which may block the rotation of the shaft of the turbocharger. Exceeding the thermal resistance limits of the materials may also damage the operation of this turbocharger.

In order to limit the increase in the temperature of the turbocharger associated with the automatic stoppages of the internal combustion engine, it is known to use an additional water pump, fed by the electric part of the engine, to cool this turbocharger when the internal combustion engine is stopped.

However, installing such a pump is costly and its use increases energy consumption.

OBJECT OF THE INVENTION

The aim of the present invention is to limit the increase in the temperature of the turbocharger associated with the stopping of the oil circulation in automatic stoppages of this engine inexpensively and economically in terms of energy.

To this end, the present invention proposes a method for managing the automatic stopping of the engine of an automobile, wherein the following steps are carried out:

a) a value representative of the temperature of the exhaust gases circulating in an exhaust duct of said engine upstream of a turbine of a turbocharger placed on the line of this exhaust duct is determined, b) this value representative of the temperature of the exhaust gases upstream of the turbine is compared with a predetermined threshold value, c) if the value representative of the temperature of the exhaust gases upstream of the turbine is higher than said predetermined threshold value, the timing-out of a first predetermined time delay Tempo-in is initiated during which the steps a) and b) are repeated, if, in the step c), during the timing-out of the first time delay Tempo-in, a value representative of said temperature lower than said predetermined threshold value is determined, the timing-out of this first delay is suspended and the step d) is carried out, d) if the value representative of the temperature of the exhaust gases upstream of the turbine is lower than said predetermined threshold value, the timing-out of a second predetermined time delay Tempo-out is initiated during which the steps a) and b) are repeated, if, in the step d), during the second time delay Tempo-out, a value representative of said temperature higher than said predetermined threshold value is determined, the timing-out of the second time delay Tempo-out is stopped, the measurement of this timing-out of the second time delay is reset and the step c) is carried out, e) if the first time delay Tempo-in has timed out and the value representative of the temperature of the exhaust gases upstream of the turbine is higher than said predetermined threshold value, the automatic stopping of the engine is prohibited, f) if the second time delay has timed out and the value representative of the temperature of the exhaust gases upstream of the turbine is lower than said predetermined threshold value, the automatic stopping of the engine is allowed and the measurement of the timing-out of the first time delay is reset.

Thus, by virtue of the method according to the invention, the automatic stopping of the engine is prevented if the temperature upstream of the turbocharger is higher than a threshold value. The oil circulation for the cooling of the internal combustion engine cannot therefore be stopped and the increase of the internal temperature of the central housing is limited.

According to other advantageous and nonlimiting characteristics of the method according to the invention, wherein:

in the step c), the first time delay Tempo-in being zero, the step e) is carried out directly by prohibiting the automatic stopping of the engine, and in the step d), the second time delay Tempo-out being zero, the step f) is carried out directly by allowing the automatic stopping of the engine;

in the step c), the timing-out of said first time delay is measured by the incrementation of a first counter t1 between t1=0 and t1=Tempo-in, in the step d), the timing-out of said second time delay is measured by the incrementation of a second counter t2 between t2=0 and t2=Tempo-out;

the steps a) and b) are carried out continuously while the engine is operating;

in the step a), said temperature is measured by virtue of a sensor positioned in the exhaust duct, upstream of the turbine of the turbocharger;

in the step a), said temperature is estimated on the basis of the values of the speed and of the load of the engine;

in the step a) an integration value of the function representative of this temperature is determined as a function of time;

in the step b) said value representative of the temperature of the exhaust gases upstream of the turbine is compared with a predetermined threshold value according to the direction of variation of said representative value;

in the step b), said predetermined threshold value is determined according to at least one operating parameter of the engine, such as the engine oil temperature and the engine water temperature.

The invention also relates to a method for automatically stopping the engine of an automobile wherein:

g) the speed of this vehicle is determined, h) this determined speed value is compared with a threshold speed value, i) a determination is made as to whether the automatic stopping of the engine is allowed or prevented by the implementation of the method for managing the automatic stopping of the engine described previously, j) if said determined speed value is lower than said threshold speed value and the automatic stopping of the engine is allowed, the engine is stopped, k) if said determined speed value is lower than said threshold speed value and the automatic stopping of the engine is prevented, the successive steps of the method are resumed from the step g), l) if said determined speed value is higher than said threshold speed value, the successive steps of this method are resumed from the step g).

DETAILED DESCRIPTION OF AN EXEMPLARY EMBODIMENT

The following description, in the light of the appended drawings, given as a nonlimiting example, will give a clear understanding of what the invention comprises and how it can be embodied.

In the appended drawings.

Figure 1:
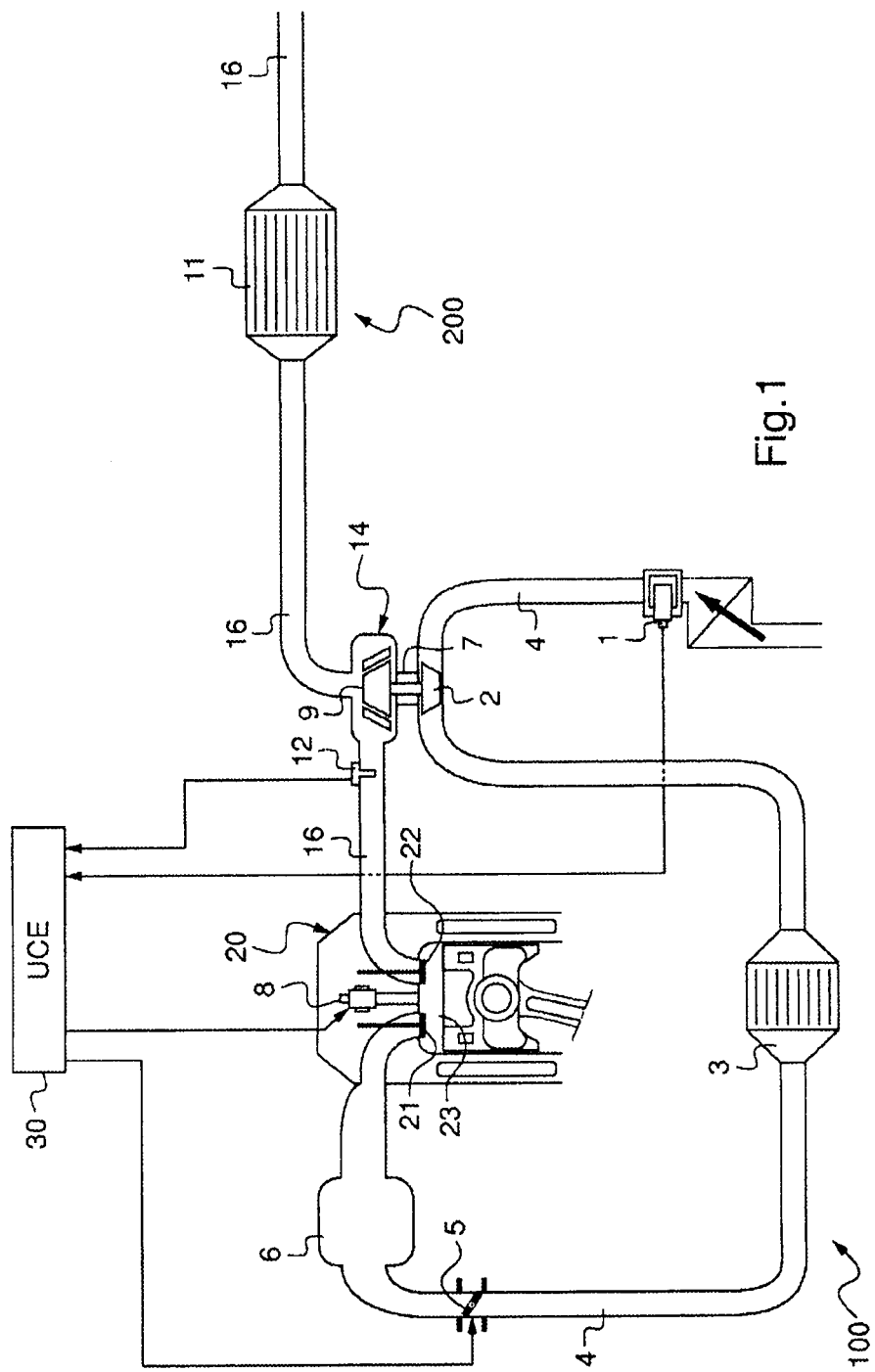
FIG. 1 is a schematic view of the various members of an internal combustion engine allowing for the implementation of the method in accordance with the invention.

FIG. 1 shows a supercharged internal combustion engine comprising a combustion chamber 23 fed with fresh air by an intake line 100 and opening downstream onto an exhaust line 200.

Hereinafter in the description, the terms "upstream" and "downstream" are defined relative to the direction of flow of the gases in the intake line 100 and exhaust line 200.

The intake line 100 comprises an intake duct 4 in which fresh air circulates. The flow rate of fresh air is measured at the inlet of the intake duct 4 by an air flow meter 1.

The internal combustion engine comprises a turbocharger 14 comprising a compressor 2 and a driving turbine 9. The driving turbine 9 is placed in an exhaust duct 16 and drives the compressor 2 placed in the intake duct 4 in order to compress the gas circulating therein.

The driving turbine 9 is linked to the compressor 2 by a shaft positioned in the central housing 7 of the turbocharger 14.

The turbocharger 14 is cooled by an oil circulation which is not represented in FIG. 1.

As a variant, the turbocharger 14 may also be cooled by a water circulation ensured by the operation of an additional water pump.

The intake duct 4 opens into an intake manifold 6. It comprises an intake throttle 5 situated upstream of this manifold 6 whose orientation relative to the axis of the intake duct 4 controls the flow rate of gas circulating in the intake duct 4 entering into the manifold 6.

The manifold 6 is linked to an inlet valve 21 of a cylinder 20 of the engine. The gas circulating in the intake duct 4 enters via an intake valve comprising this inlet valve 21 in a combustion chamber 23 of the cylinder 20 and an injector 8 is provided which injects the fuel into this combustion chamber 23.

After combustion, the residual exhaust gases are expelled toward the exhaust duct 16 through an exhaust valve 22.

The exhaust gases circulate in the exhaust duct 16 to arrive at the driving turbine 9 of the turbocharger 14. They then preferentially pass through a system 11 for treating the exhaust gases comprising, for example, an oxidation catalytic converter placed upstream of a particulate filter of the exhaust line 200.

According to the embodiment represented in FIG. 1, a temperature sensor 12 is placed upstream of the turbine 9 of the turbocharger 14. This sensor preferentially continuously measures the temperature of the exhaust gases circulating in the exhaust duct 16 at the outlet of the combustion chamber 23, hereinafter called the pre-turbine temperature and denoted Tavt.

This measurement of the pre-turbine temperature Tavt is transmitted to an electronic control unit 30 of the engine (UCE). This electronic control unit 30 also receives information recorded by numerous other sensors of the engine, relating, for example, to the flow rate of air at the inlet of the intake duct, to the speed and the load of the engine, or to the speed of the vehicle propelled by this engine. It controls in particular the positioning of the intake throttle 5, the quantity of fuel injected by the injector 8 and the moment of this injection.

The electronic control unit 30 of the engine also has means for automatically stopping the engine, making it possible to stop the internal combustion engine without the intervention of the driver, for example by interrupting the injection of fuel into the combustion chamber.

In a noteworthy manner, the electronic control unit is programmed to implement the method for managing the automatic stopping of the engine according to the invention.

For this, the electronic control unit 30 is programmed to carry out the following steps, when the internal combustion engine is running:

step a): determining a value representative of the temperature of the exhaust gases circulating in an exhaust duct of said engine upstream of a turbine of a turbocharger placed on the line of this exhaust duct, step b): comparing this value representative of the temperature of the exhaust gases upstream of the turbine to a predetermined threshold value.

According to the embodiment represented in FIG. 1, to carry out the step a), the electronic control unit 30 records the measurement of the pre-turbine temperature Tavt measured by the sensor 12.

The predetermined threshold value of the pre-turbine temperature is denoted Tavt_thresh, and is, for example, between 670 degrees Celsius and 750 degrees Celsius.

It is, for example, determined in the step b) according to at least one operating parameter of the engine, for example according to the engine oil temperature and/or the engine water temperature.

If this pre-turbine temperature Tavt is higher than said predetermined threshold value in the step b), the electronic control unit 30 then carries out a step c), by initiating the timing-out of a first predetermined time delay Tempo-in during which the steps a) and b) are repeated.

If, in the step c), during the timing-out of the first time delay Tempo-in, the electronic control unit 30 determines a pre-turbine temperature Tavt lower than said predetermined threshold value, the timing-out of this first delay Tempo-in is suspended and the step d) described below is carried out.

When the first time delay Tempo-in has timed out and the value representative of the temperature of the exhaust gases upstream of the turbine is higher than said predetermined threshold value, the electronic control unit carries out the step e) of the method by prohibiting the automatic stopping of the engine. The electronic control unit then preferentially resumes the execution of the method at the step a).

If the pre-turbine temperature determined in the step a) is lower than said predetermined threshold value in the step b), the electronic control unit then carries out the step d) by initiating the timing-out of a second predetermined time delay Tempo-out during which the steps a) and b) are repeated.

If, in the step d), during the timing-out of the second time delay Tempo-out, the electronic control unit determines a pre-turbine temperature higher than said predetermined threshold value, the timing-out of the second time delay Tempo-out is stopped, the measurement of the timing-out of this second time delay Tempo-out is reset and the step c) is carried out.

When the second time delay has timed out and the value representative of the temperature of the exhaust gases upstream of the turbine is lower than said predetermined threshold value, the control unit carries out the step f) of the method by allowing the automatic stopping of the engine and by resetting the measurement of the timing-out of the first time delay Tempo-in. The electronic control unit then preferentially resumes the execution of the method at the step a).

The first delay Tempo-in may be zero. The electronic control unit 30 then carries out the step e) of the method and resumes at the step a).

The second delay Tempo-out may also be zero: the electronic control unit 30 then immediately allows the stopping of the engine, and resumes at the step a).

Figure 2:
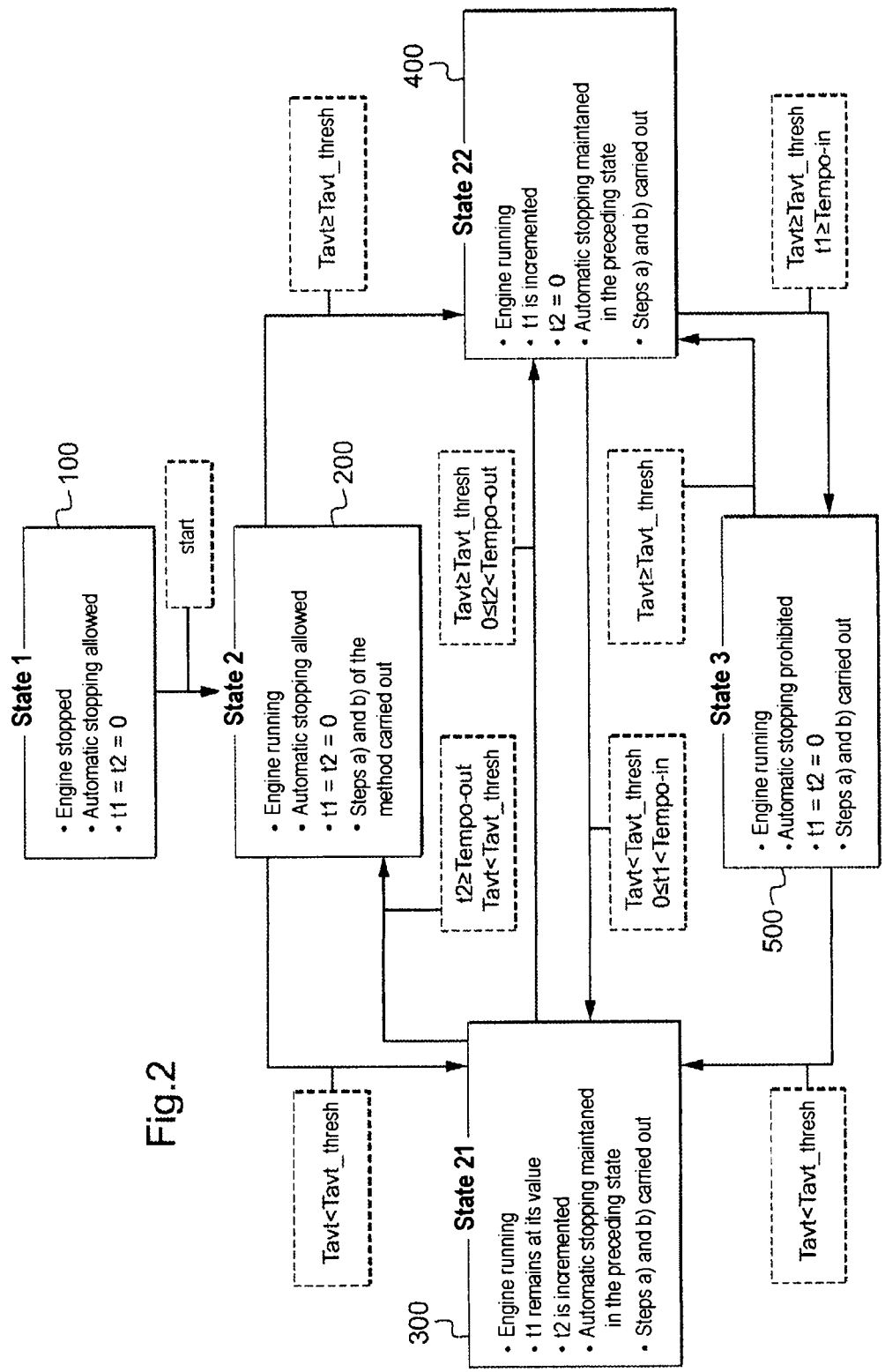
FIG. 2 is a block diagram schematically representing the various steps of the method for managing the automatic stopping of the engine in accordance with the invention.

In practice, an embodiment of this method is represented in FIG. 2. The electronic control unit 30 measures the timing-out of each of these delays by the incrementation of a time counter and indicates the state of inhibition of the automatic stopping of the engine by an output variable denoted, in FIG. 2, Automatic Stop which can take two values: "allowed" or "prohibited". A first time counter t1 is incremented between the values t1=0 and t1=Tempo-in to measure the timing-out of the first delay Tempo-in and a second time counter t2 is incremented between the values t2=0 and t2=Tempo-out to measure the timing-out of the second delay Tempo-out.

Initially, when the engine is stopped, before the introduction of the contact key by the driver or on an automatic or deliberate stoppage of the engine, the automatic stopping is allowed by default and the first and second counters are set to zero. This state of the engine is denoted state 1 in FIG. 2 and is represented in the box 100.

On starting or automatically restarting the engine, said engine switches to the state denoted state 2, represented in the box 200 of FIG. 2, in which the engine is running, the automatic stopping is allowed by default and the first and second counters are set to zero.

As soon as the engine is running, the electronic control unit 30 preferentially continuously carries out the abovementioned steps a) and b) of the method.

According to this embodiment, in the step b), the central unit continuously compares the measured pre-turbine temperature Tavt with a same threshold value denoted Tavt_thresh.

According to the embodiment described here, if the pre-turbine temperature Tavt is higher than the threshold value Tavt_thresh, the electronic control unit 30 initiates the step c) of the method: the engine switches to the state 22 represented in the box 400 of FIG. 2, in which the engine is running, the first counter t1 is regularly incremented, and the second counter t2 is maintained at zero.

The authorized or prohibited state of the automatic stopping of the engine is not modified by switching to this state 22 of the engine. In other words, when the electronic control unit switches the engine from the state 2 to the state 22, the automatic stopping remains allowed in the state 22.

If, while the engine is in this state 22, the pre-turbine temperature Tavt becomes lower than the threshold value Tavt_thresh, the electronic control unit carries out the step d) of the method by switching the engine to a state 21 represented in the box 300 of FIG. 2, in which the engine is running, the incrementation of the first counter t1 is suspended, and the second counter t2 is incremented. As previously, the state of the Automatic Stop variable is unchanged.

If, when the engine is in the state 2, the measured pre-turbine temperature Tavt is lower than the threshold value Tavt_thresh, the electronic control unit 30 initiates the step d) of the method by placing the engine in this state 21 represented in the box 300 of FIG. 2. In this case, the first counter t1 which was at zero in the state 2 of the engine is maintained at zero, and the second counter t2 is incremented.

The authorized or prohibited state of the automatic stopping of the engine is not modified by switching to this state 21 of the engine. In other words, when the electronic control unit 30 switches the engine from the state 2 to the state 21, the automatic stopping remains allowed in the state 21.

If, while the engine is in the state 21, the pre-turbine temperature Tavt becomes higher than the threshold value Tavt_thresh, the electronic control unit 30 carries out the step c) of the method by switching the engine to the state 22, and the second counter is set to zero, whereas the first counter is incremented. As previously, the state of the Automatic Stop variable is unchanged.

When the first counter t1 reaches its maximum value Tempo-in, the engine is then in the state 22 and the pre-turbine temperature Tavt is higher than or equal to the threshold value Tavt_thresh. The electronic control unit 30 then switches the engine to the state 3, represented in the box 500 of FIG. 2, in which the engine is running, the first counter t1 and the second counter t2 are reset to zero and the state of the Automatic Stop variable of the engine indicates that the latter is prohibited, which carries out the step e) of the method.

When the second counter t2 reaches its maximum value Tempo-out, the engine is then in the state 21 and the pre-turbine temperature Tavt is lower than or equal to the threshold value Tavt_thresh. The electronic control unit 30 then returns the engine to the state 2, represented in the box 200 of the FIG. 2, in which the engine is running, the first counter t1 and the second counter t2 are reset to zero and the state of the Automatic Stop variable of the engine indicates that the latter is allowed, which carries out the step f) of the method.

When the engine is in the state 3, the electronic control unit 30 carries out the steps a) and b) of the method and, depending on the comparison of the measured pre-turbine temperature Tavt and the threshold value Tavt_thresh in the step b), the electronic control unit 30 similarly switches the engine to one or other of the states 21 and 22 described previously by carrying out the steps c) and d) of the method. Since the state of the Automatic Stop variable is unchanged on switching from the state 3 to the state 21 or 22, the automatic stopping is then prohibited in the states 21 and 22.

As previously, if the second counter t2 is incremented to its maximum value Tempo-out, the electronic control unit 30 switches the engine to the state 2 (step f)), whereas if the first counter t1 is incremented to its maximum value Tempo-in, the electronic control unit returns the engine to the state 3 (step e)).

The steps a) and b) for measuring the pre-turbine temperature Tavt and for comparing this temperature with a threshold value Tavt_thresh are preferentially carried out continuously by the electronic control unit 30.

As a variant, the electronic control unit 30 may be programmed so that the steps a) and b) are carried out at predetermined instants according to the operation of the engine, or at regular intervals.

As a variant, the electronic control unit estimates, in the step a), said pre-turbine temperature Tavt on the basis of the values of the speed and of the load of the engine.

According to another variant, the value representative of the pre-turbine temperature Tavt determined by the electronic control unit is an integration value of the function representative of this temperature as a function of time. For this, the electronic control unit continuously receives the values of the pre-turbine temperature measured by the sensor 12 and, when this measured pre-turbine temperature exceeds a preliminary threshold value, the electronic control unit determines an integration value of the function representative of this temperature as a function of time, by computing, for example, the area situated between the curve representative of the pre-turbine temperature as a function of time and the straight line for which the pre-turbine temperature Tavt is equal to said preliminary threshold value.

The method for managing the automatic stopping of the automobile engine presents a particularly advantageous application for the implementation of a method for automatically stopping this engine comprising, according to the invention, the following steps:

g) the speed of said vehicle is determined,
h) this determined speed value is compared with a threshold speed value,
i) a determination is made as to whether the automatic stopping of the engine is allowed or prevented by the implementation of the method for managing the automatic stopping of the engine described previously,
j) if said determined speed value is lower than said threshold speed value and the automatic stopping of the engine is allowed, the engine is stopped,
k) if said determined speed value is lower than said threshold speed value and the automatic stopping of the engine is prevented, the successive steps of this method are resumed from the step g),
l) if said determined speed value is higher than said threshold speed value, the successive steps of this method are resumed from the step g).

In practice, the step i) may be carried out either following the steps g) and h), or continuously while the engine is operating.

If the step i) is carried out continuously while the engine is operating, it is carried out before the steps j), k) and l) of the method for automatically stopping the engine and the electronic control unit 30 directly records the current value of the "Automatic Stop" variable to determine whether the automatic stopping is allowed or prohibited.

If the step i) is not carried out continuously while the engine is running, the electronic control unit 30 carries out the steps a) to e) or f) of the method for managing the automatic stopping to determine whether the automatic stopping is allowed or prohibited.

If the value of the speed of the vehicle determined in the step g) is lower than said threshold speed value and the automatic stopping of the engine is allowed, the electronic control unit implements the means for automatically stopping the engine.

By virtue of the method according to the invention, when the temperature of the exhaust gases circulating in the exhaust duct upstream of the turbine of the turbocharger is higher than the predetermined temperature threshold, the automatic stopping of the engine is inhibited. Thus, the oil circulation cooling the turbocharger, the rise in temperature of the central housing of the turbocharger, which is damaging to the operation thereof, is limited.

In particular, the coking of the oil present in this central housing at high temperature is reduced and the thermal resistance limits of the materials are not exceeded.

Moreover, when the pre-turbine temperature is lower than the temperature threshold value, the automatic stopping of the engine is allowed, and the polluting emissions from the engine are thus reduced.

According to other embodiments of the method according to the invention, the engine does not include any temperature sensor placed upstream of the turbine of the turbocharger. The temperature of the exhaust gases is then estimated by computation or by the use of charts based, for example, on the speed and the load of the engine.

The present invention is in no way limited to the embodiments described and represented but those skilled in the art will be able to add any variant thereto as they wish.

Alternatively, provision may notably be made for the electronic control unit 30 to compare the pre-turbine temperature Tavt to a threshold value which depends on the direction of variation of this pre-turbine temperature Tavt. For example, when the pre-turbine temperature Tavt decreases, the electronic control unit 30 compares the pre-turbine temperature to a first threshold value Tavt_thresh1, and when the pre-turbine temperature Tavt increases, the electronic control unit 30 compares the pre-turbine temperature to a second threshold value Tavt_thresh2. The other steps of the method are unchanged.

Provision may also be made to record the threshold value Tavt_thresh of the pre-turbine temperature when the oil temperature of the oil circulation cooling the turbocharger is lower than a given threshold.

The invention claimed is:

1. A method for managing automatic stopping of an engine of an automobile, comprising:
   a) determining a value representative of temperature of exhaust gases circulating in an exhaust duct of the engine upstream of a turbine of a turbocharger placed on a line of the exhaust duct;
   b) comparing the value representative of the temperature of the exhaust gases upstream of the turbine with a predetermined threshold value;
   c) if the value representative of the temperature of the exhaust gases upstream of the turbine is higher than the predetermined threshold value, timing-out of a first predetermined time delay is initiated during which the determining a) and the comparing b) are repeated;
   if, in c), during the timing-out of the first time delay, a value representative of the temperature lower than the predetermined threshold value is determined, the timing-out of the first delay is suspended and an operation d) is carried out;
   d) if the value representative of the temperature of the exhaust gases upstream of the turbine is lower than the predetermined threshold value, the timing-out of a second predetermined time delay is initiated during which the determining a) and the comparing b) are repeated;
   if, in d), during the second time delay, a value representative of the temperature higher than the predetermined threshold value is determined, the timing-out of the second time delay is stopped, measurement of this timing-out of the second time delay is reset and c) is carried out;
   e) if the first time delay has timed out and the value representative of the temperature of the exhaust gases upstream of the turbine is higher than the predetermined threshold value, the automatic stopping of the engine is prohibited;
   f) if the second time delay has timed out and the value representative of the temperature of the exhaust gases upstream of the turbine is lower than the predetermined threshold value, the automatic stopping of the engine is allowed and the measurement of the timing-out of the first time delay is reset.

2. The method as claimed in claim 1, wherein:
   in c), the first time delay being zero, e) is performed directly by prohibiting the automatic stopping of the engine,
   in d), the second time delay being zero, f) is performed directly by allowing the automatic stopping of the engine.

3. The method as claimed in claim 1, wherein:
   in c), the timing-out of the first time delay is measured by incrementation of a first counter t1 between t1=0 and t1=Tempo-in,
   in d), the timing-out of the second time delay is measured by incrementation of a second counter t2 between t2=0 and t2=Tempo-out.

4. The method as claimed in claim 1, wherein:
   the determining a) and the comparing b) are carried out continuously while the engine is operating.

5. The method as claimed in claim 1, wherein, in the determining a), the temperature of the exhaust gases upstream of the turbine is measured by virtue of a sensor positioned in the exhaust duct, upstream of the turbine of the turbocharger.

6. The method as claimed in claim 1, wherein, in the determining a), the temperature of the exhaust gases upstream of the turbine is estimated based on values of speed and load of the engine.

7. The method as claimed in claim 1, wherein, in the determining a), an integration value of the function representative of the temperature of the exhaust gases upstream of the turbine is determined as a function of time.

8. The method as claimed in claim 1, wherein, in the comparing b), the value representative of the temperature of the exhaust gases upstream of the turbine is compared with a predetermined threshold value according to a direction of variation of the representative value.

9. The method as claimed in claim 1, wherein, in the comparing b), the predetermined threshold value is determined according to at least one operating parameter of the engine.

10. A method for automatically stopping an engine of an automobile comprising:
    g) determining a speed of the vehicle;
    h) comparing the determined speed value with a threshold speed value;
    i) determining whether the automatic stopping of the engine is allowed or prevented by implementation of a method for managing the automatic stopping of the engine as claimed in claim 1;
    j) if the determined speed value is lower than the threshold speed value and the automatic stopping of the engine is allowed, the engine is stopped;
    k) if the determined speed value is lower than the threshold speed value and the automatic stopping of the engine is prevented, successive operation of this method are resumed from the determining g);
    l) if the determined speed value is higher than the threshold speed value, successive operation of this method are resumed from the determining g).

* * * * *